United States Patent [19]
de Ruiter et al.

[11] Patent Number: 5,616,169
[45] Date of Patent: Apr. 1, 1997

[54] SEAL-FREE AND FRAME-FREE ODOR AND/OR POLLUTANT FILTER

[75] Inventors: Ernest de Ruiter, Höhenstrasse 57a, D-51381 Leverkusen; Jonas Tornblom, Erkrath, both of Germany

[73] Assignees: Hasso von Blucher, Erkrath; Ernest de Ruiter, Leverkusen, both of Germany

[21] Appl. No.: 491,631

[22] Filed: Jun. 19, 1995

[30] Foreign Application Priority Data

Jun. 17, 1994 [DE] Germany .................... 44 21 217.8
Mar. 31, 1995 [DE] Germany ................. 195 12 028.0

[51] Int. Cl.$^6$ .................................................. B01D 53/04
[52] U.S. Cl. ...................... 95/90; 95/116; 95/141; 96/131; 96/135; 96/153; 55/DIG. 42
[58] Field of Search ............... 95/90, 116, 141; 96/131, 135, 138, 153, 154; 55/DIG. 42

[56] References Cited

U.S. PATENT DOCUMENTS

| | | | |
|---|---|---|---|
| 3,721,072 | 3/1973 | Clapham | 96/153 |
| 3,925,248 | 12/1975 | Moroni et al. | 96/153 X |
| 4,013,566 | 3/1977 | Taylor | 96/153 X |
| 4,510,193 | 4/1985 | Blücher et al. | 96/154 X |
| 4,519,816 | 5/1985 | Clarke | 55/DIG. 42 |
| 4,668,258 | 5/1987 | Steer | 96/135 X |
| 4,678,489 | 7/1987 | Bertlesen | 96/135 |
| 4,699,681 | 10/1987 | Kasmark, Jr. et al. | 96/154 X |
| 4,875,899 | 10/1989 | Holtermann | 96/153 X |
| 4,981,501 | 1/1991 | von Blücher et al. | 96/153 |
| 4,992,084 | 2/1991 | von Blücher et al. | 96/153 X |
| 5,226,937 | 7/1993 | Linnetsten et al. | 55/DIG. 42 |
| 5,308,703 | 5/1994 | Tsujimoto et al. | 96/154 X |
| 5,338,253 | 8/1994 | Damsohn et al. | 96/154 X |
| 5,350,443 | 9/1994 | von Blücher et al. | 96/154 X |
| 5,350,444 | 9/1994 | Gould et al. | 96/154 |
| 5,395,428 | 3/1995 | von Blücher et al. | 96/154 X |

FOREIGN PATENT DOCUMENTS

| | | | |
|---|---|---|---|
| 2678522 | 1/1993 | France | 96/154 |
| 3228156 | 2/1984 | Germany | 96/154 |
| 4241605 | 6/1994 | Germany | 96/154 |
| 51-011085 | 1/1976 | Japan | 96/154 |
| 55-084514 | 6/1980 | Japan | 96/153 |
| 55-099319 | 7/1980 | Japan | 96/154 |
| 2032298 | 5/1980 | United Kingdom | 96/154 |
| 2138695 | 10/1984 | United Kingdom | 96/154 |

*Primary Examiner*—Robert Spitzer
*Attorney, Agent, or Firm*—Cohen, Pontani, Lieberman, Pavane

[57] ABSTRACT

A seal-free and frame-free odor and/or pollutant filter, e.g., in air conditioners and motor vehicles, having a self-supporting and elastic adsorption filter bed installed under slight compression in air supply ducts. The filter bed is made of a highly air-permeable substrate material and an adsorbent affixed thereto by an adhesive mass.

34 Claims, No Drawings

SEAL-FREE AND FRAME-FREE ODOR AND/OR POLLUTANT FILTER

BACKGROUND OF THE INVENTION

1. Field of the Invention

The present invention relates to an odor filter and/or pollutant filter for air supply ducts, for example, in air conditioners, motor vehicles and means of transportation. The invention more particularly relates to such a filter having an adsorption filter bed.

2. Description of the Prior Art

Conventional particle filters based on current knowledge are not sufficient to purify air flows (e.g., in air conditioners, supply air for motor vehicles, etc.) because they are unable to retain gaseous components, in particular, odors or pollutants. The impact of such inabilities on health and well-being were largely underestimated in the past. To overcome this problem an adsorption filter was added after the particle filters.

Today, adsorption filters are manufactured primarily on the basis of activated charcoal. In stationary units, thin packings are used, but these are not suitable for use in motor vehicles. Packed filters always entail a compromise with respect to particle size: the absorption kinetics require small adsorbent particles, but for the sake of a smaller pressure drop the particles should be large. Furthermore, gas formation can easily occur. Also, maintaining or exchanging the filter becomes more difficult and greater contamination occurs. The development of the "expanded fixed bed" principle largely eliminated these disadvantages.

According to this principle, small adsorbent particles are affixed to an open substrate structure, which usually is shaped like a flat sheet. In this way, the compromise on particle size is avoided. Furthermore, the flat low-dust filter elements are easy to exchange, making maintenance significantly less labor-intensive than it is in the case of conventional filters. For air supply ducts in motor vehicle cabins, flat filters as well as folded filters have been introduced or are under development. Flat filters may be constructed of activated charcoal particles which adhere to one another as well as according to the "expanded fixed bed" principle. These filter media are fixed or foamed into a frame by means of a seal, and this frame is installed in the air supply duct. A significant disadvantage of these filters is that they have an increased space requirement due to their frames and seals. Furthermore, these filters are complicated and thus expensive to manufacture. Significant problems also arise during their disposal or recycling, because the various materials permanently connected to one another interfere with the requirement to separate materials.

SUMMARY AND DESCRIPTION OF THE INVENTION

Accordingly, it is an object of the present invention to provide an odor and pollutant filter which is seal-free and frame-free.

Pursuant to this object, and others which will become apparent hereafter, one aspect of the present invention resides in a seal-free and holder-free odor and/or pollutant filter having a self-supporting elastic adsorption filter bed, which is installed in air supply ducts under slight compression and is made of a highly air-permeable substrate material having an adsorbent affixed thereto by an adhesive mass. This adsorption filter bed is a filter medium based on the "expanded fixed bed" principle.

Self-supporting and elastic adsorption filter beds are known. For example, DE-A-38 13 563 describes a filter material that consists of a reticulated PU foam loaded with activated charcoal.

In a particular embodiment of the invention, such adsorption filter beds are used in combination with air conditioners, motor vehicles and means of transportation.

Any large-pored foam, particularly a reticulated PU foam, may be used as the highly air-permeable substrate material for the invention.

The adsorbent may also be affixed to the skeleton of this substrate material with the help of an adhesive mass. In this way, a self-supporting adsorption filter bed is created.

Methods for disposing of or recycling the adsorption filter beds used according to the invention are known in the art.

On the one hand, the adsorption filter bed should be sufficiently elastic, while on the other hand, it should at the same time have sufficiently high form stability. An adsorption filter bed has sufficient elasticity as well as sufficiently high form stability if, after being extended 20 cm over the edge of a support surface (e.g., a table), its outermost end drops downward by only 2 to 20 times, in particular by 2 to 5 times, the thickness of the adsorption filter bed. It is obvious that thicker plates will sag less than thin plates.

The advantage of using the materials according to the invention is that these materials can be placed directly in the air duct without special sealing and without an additional frame. Of course, the air duct may have narrow guide rails, for easier insertion.

The reticulated open-pored PU foam may have a porosity of 8 to 30 ppi (pores per inch). Such foams are described, for example, in EP-B-340 542.

This PU foam is subjected to an adhesive mass and then thoroughly loaded with a suitable adsorbent which is 0.3 to 1 mm in size. This loading of the inner surface of the plastic foam, particularly a complete loading, leads to very high rigidity. Nonetheless, the material can still be compressed enough to allow the flat sheets having suitable excess dimensions to be introduced under tension into the air supply ducts intended for them.

Surprisingly, it was found that with the present invention any openings in the edge area (a so-called "edge passage") of the adsorption filter bed are completely avoided.

According to a special embodiment of the invention, the particle size of the adsorbent is at least three times smaller than the pore diameter of the PU foam.

The compressibility of the loaded PU foam should be at least 2% under a pressure of 1 to $10N/cm^2$.

The adsorption filter bed may also consist of a plurality of layers of adsorption filter beds. In general, the thickness of the individual adsorption filter beds is between 5 and 40 mm, particularly between 10 and 30 mm. In a multi-layered adsorption filter bed, the thickness of each individual bed is approximately 5 to 30 mm.

The following may be used as the adsorbent:

Activated charcoal (carbonized and then activated material originating from vegetable raw materials—wood, peat, hard coal, etc.), Spherical activated charcoal from coal-tar pitch or petroleum residues having a diameter of 0.2 to 2 mm, preferably 0.3 to 1 mm, and/or an inner surface (determined using the BET method) of at least 900 $m^2/g$ and/or a bursting pressure of at least 10N, preferably at least 30N when a sphere having a diameter of 0.5 mm is used (such spherical activated charcoal is described, for example, in GB-B-1 525 420, GB-B-2 012 257, GB-A 2 025 385 and GB-A-2 053 176), Splint or granular coal with a particle size of 0.2 to 2 ram, preferably 0.3 to 1.0 mm, and an inner surface of at least 900 m$^2$/g (such coal is described, for example, in "Activated Charcoal and its Industrial Application" ["*Aktivkohle und ihre industrielle Anwendung*"] by H.von Kienle, E. Baeder, Ferdinand Enke Verlag, Stuttgart, 1980), Carbonized and activated porous polymers based on sulfonated styrene-divinyl-benzol copolymers or styrene-acrylic acid copolymers (such carbonized polymers are described, for example, in U.S. Pat. No. 4,040,990, U.S. Pat. No. 4,224,415 and U.S. Pat. No. 4,957,897), Carbonized and activated ion exchangers based on sulfonated styrene-divinyl-benzol copolymers or styrene-acrylic acid copolymers (the manufacture of activated charcoal from ion exchangers of this type is described, for example, in DD-B-063 768 and DE-A-43 04 026) or carbonized and activated anion exchangers based on polystyrene resins or polyacrylic resins having tertiary or quaternary amino groups, particularly ion exchangers of the gel type (such ion exchangers are described, for example, in DE-A-43 28 219), Porous (non-carbonized) polymers based on a copolymer of styrene and divinyl benzol cross-linked via $CH_2$ bridges (as sold by the Dow Chemical Corp. under the tradename Sorbathene®, for example), Form particles of molecular sieves, preferably hydrophobic molecular sieves with an $SiO_2/Al_2O_3$ module of >10 (as sold by Degussa AG under the name DAY-Zeolith®, for example).

The adsorbent may be worked into the PU foam according to DE-A-38 13 563, for example.

In a preferred embodiment of to the invention, the adsorption filter bed contains 50 to 400 g/l, preferably 150 to 350 g/l of adsorbent.

The amount of adhesive mass used in the adsorption filter bed equals the weight of the highly air-permeable substrate material ±50%. Organic cross-linkable polymers may be used as the adhesive mass, for example: derivatives of acrylic acid, polyurethane, polystyrene, polyisocyanate and polyvinyl acetate, or hot-melt adhesive.

According to a another embodiment of the invention, a pre-polymer low-solvent two-component system based on masked diisocyanates and/or polyisocyanates, which is cross-linked to diamines and/or polyamines, is used as the adhesive mass. This adhesive mass has good initial adherence and displays a marked viscosity minimum during the cross-linking phase, resulting in optimal adherence. This viscosity minimum of the adhesive mass reduces the contact surface between the substrate material and the adsorbent to a minimum, so that the high air permeability of the substrate material is maintained. These systems preferably use the products sold by BAYER AG under the name "IMPRA-NIL® High Solid PURE Reactive Products."

A further preferred adhesive mass consists of non-masked polymeric diisocyanates and/or polyisocyanate, such as those sold by BAYER AG under the name Levacast® Addukt 43131 N, for example. The cross-linking reaction is initiated by the moisture present in the adsorbent.

The filter bed used according to the invention may also consist of a plurality of adsorption filter beds placed one atop the other and having the same or different characteristics in respect to thickness, adsorbent or adhesive mass.

Furthermore, it is possible to design the elastic adsorption filter bed to have a slight convex curvature toward the flowed-against side. In this way, the mechanical loadability of the adsorption filter bed is increased while at the same time the adsorption filter bed is pressed against the inner sides of the air supply duct (or against the guide rails) by the air flow, which increases density even further.

In a further embodiment of the invention, an additional reinforcement element is placed between the adsorption filter beds or on the exit side of the air supply duct. This reinforcement element is also seal-free and frame-free. Meshes, especially polyamide meshes, are suitable for this, for example.

The inventive filter, when used in air supply ducts for odor or pollutant removal requires no frames or seals. This reduces production costs and, at the same time, results in considerably more environmentally-friendly disposal. A further advantage of the inventive filter is that the filter media can be changed very simply. To do this, it suffices to locate a removable lid which permits access to the filter medium on or any accessible location of the air duct. The filter medium previously placed into the air duct under slight compression can then be withdrawn and renewed as needed. In a similar manner, the described adsorption filter beds can be installed without edge seals or additional frames in the outlets of air conditioners in buildings.

In contrast, it is not possible for flat filters that are self-supporting but not elastic to be installed in air ducts without elastic sealing. Moreover, tests have shown that it is difficult, even with such sealing, to fix the flat filter in place without additional framing.

EXAMPLES

The following examples serve to explain the invention:

EXAMPLE 1

A 20 mm thick, reticulated PU foam having 12 ppi and a liter weight of 30 g was subjected to a mixture of 100 parts Impranil HS 62 and 6.2 parts Imprafix HSC and squeezed out. The squeezing effect was 100%. The plastic foam mat was then strewn with spherical activated charcoal based on pitch; the excess was removed; and the adhesive was condensed out at 160° C. (2 min). The spherical charcoal had a diameter of 0.4 to 0.6 mm; its inner surface was 100 m$^2$/g and its quantity was 195 g/l.

At the point where the filter material was introduced into the air duct, the air duct had a screw-off lid. The side walls, base and lid had approximately 3 mm high guide rails of a U-profile spaced 39 mm apart, which were attached inside the air duct by means of an adhesive of the type used in the aviation industry (epoxy resin). A flat sheet of 298×398×39 mm would fit exactly into these guide rails.

Two sheets of 306×408×20.5 mm were then cut out of the loaded foam and pressed into the guide rails under slight pressure and the lid was then closed.

For purposes of comparison, two foam sheets of 290×390×20.5 mm were also foamed into a plastic frame and introduced into the air duct. Comparative measurements with 1000 ppm toluol in nitrogen at 0.5 m/s showed, contrary to expectations, that the filter installed in a seal-free manner had no discernable edge passages, because a perfect seal had been achieved by introducing into the air duct a filter sheet that was somewhat too large and thus slightly compressed. The initial opening was ≦1 ppm. The omission of the usual filter frame, including foam-in, made a filter surface available that was larger by approximately 10%, the end effect of which was beneficial for filter performance.

The filter element was renewed in the simplest way imaginable: after opening the lid, the old element was pulled out and a new filter element was inserted.

EXAMPLE 2

The procedure was as in Example 1; however, instead of the activated charcoal granules, carbonized and activated cation exchangers (sulfonated styrene-divinyl-benzol polymers) were used. No comparative measurements were carried out.

EXAMPLE 3

The procedure was as in Example 2; however, porous polymers (Sorbathene, made by the Dow Chemical Corp.) were used as the adsorbent. Only 165 g adsorbent per liter could be worked in, and the initial opening of approximately 2 ppm was somewhat higher than in Example 2.

EXAMPLE 4

The filter mats were loaded with briquettes, approximately 1 mm in size, from hydrophobic molecular sieves (DAY Zeolith of Degussa AG). The substrate plastic foam could be loaded with 95 g/l.

EXAMPLE 5

For the sake of completeness, the spherical charcoal of Example 1 was replaced by a high-quality splint coal (particle size 0.5 to 0.8 mm, inner surface 1650 $m^2/g$). The smaller load of 145 g/l (compared to 185 g/l with the spherical charcoal) had no noticeable effect and, as expected, no edge passages were detected.

EXAMPLE 6

The procedure was as in Example 5; however, a coarse mesh (openings of 40×40 mm) of a 1 mm steel wire was added between the two filter sheets as extra stiffening. In practice, it has been shown that such reinforcement is not necessary; however, in especially hot countries it could be beneficial. Of course, other material could also be used for additional stiffening. The reinforcement may also be located externally on the exit side of the filter.

The invention is not limited by the embodiments described above which are presented as examples only but can be modified in various ways within the scope of protection defined by the appended patent claims.

I claim:

1. A process for filtering air in air supply duct, comprising the step of installing a self-supporting elastic adsorption filter bed under compression in the air supply duct in a seal-free and frame-free manner, the filter bed being made of a highly air-permeable substrate material, an adsorbent fixed to the substrate material in an amount of 50 to 400 g/l, and an adhesive mass for fixing the adsorbent to the substrate material, the substrate material having a compressibility of at least 2% under a pressure of 1 to 10N/$cm^2$.

2. A seal-free and frame-free filter for installation in an air supply duct, consisting essentially of a self-supporting elastic adsorption filter bed, wherein said filter bed is made of a highly air-permeable substrate material, an adsorbent fixed to the substrate material in an amount of 50 to 400 g/l, and an adhesive mass for fixing the adsorbent to the substrate material, the substrate material having a compressibility of at least 2% under pressure of 1 to 10N/$cm^2$.

3. A filter as defined in claim 2, wherein the air-permeable substrate material is a large-pore reticulated PU foam.

4. A filter as defined in claim 3, wherein the PU foam has a skeleton, the adsorbent being fixed to the skeleton of the PU foam by the adhesive mass.

5. The filter as defined in claim 3, wherein the PU foam has a porosity of 8 to 30 pores per inch (ppi).

6. A filter as defined in claim 3, wherein the adsorbent has a particle size that is at least three times smaller than a pore diameter of the PU foam.

7. A filter as defined in claim 2, wherein a plurality of adsorption filter beds are provided to form a single multilayered adsorption filter bed.

8. A filter as defined in claim 2, wherein the adsorption filter bed has a thickness between 5 and 40 mm.

9. A filter as defined in claim 8, wherein the adsorption filter has a thickness between 10 and 30 mm.

10. A filter as defined in claim 2, wherein the adsorbent is activated charcoal.

11. A filter as defined in claim 2, wherein the adsorbent is spherical activated charcoal having a diameter of 0.2 to 2 mm.

12. A filter as defined in claim 11, wherein the spherical activated charcoal has a diameter of 0.3 to 1 mm.

13. A filter as defined in claim 11, wherein the spherical activated charcoal has an inner surface area of at least 900 $m^2/g$ (BET method).

14. A filter as defined in claim 11, wherein the spherical activated charcoal has a diameter of 0.5 mm, the spherical activated charcoal having a bursting pressure of at least 10N.

15. A filter as defined in claim 14, wherein the spherical activated charcoal has a bursting pressure of at least 30N.

16. A filter as defined in claim 2, wherein the adsorbent is one of splint and granular coal having a diameter of 0.2 to 2 mm and an inner surface area at least equal to 900 $m^2/g$.

17. A filter as defined in claim 16, wherein the adsorbent has a diameter of 0.3 to 1 mm.

18. A filter as defined in claim 2, wherein the adsorbent is a carbonized and activated porous polymer based on one of sulfonated styrene-divinyl-benzol copolymers and sulfonated styrene-acrylic acid copolymers.

19. A filter as defined in claim 2, wherein the adsorbent is a carbonized and activated cation exchanger based on one of sulfonated styrene-divinyl-benzol copolymers and sulfonated styrene-acrylic acid copolymers.

20. A filter as defined in claim 2, wherein the adsorbent is a carbonized and activated anion exchanger based on one of polystyrene resins and polyacrylic resins having one of tertiary and quaternary amino groups.

21. A filter as defined in claim 2, wherein the adsorbent is a porous polymer based on a copolymer of styrene and divinyl benzole cross-linked via $CH_2$ bridges.

22. A filter as defined in claim 2, wherein the adsorbent is formed of form particles of hydrophobic molecular sieves.

23. A filter as defined in claim 2, wherein the adsorbent is fixed in the adsorption filter bed in an amount of 150 to 350 g/l.

24. A filter as defined in claim 2, wherein the adhesive mass has a weight equal to that of the substrate material ±50%.

25. A filter as defined in claim 2, wherein the adhesive mass contains cross-linkable polymers.

26. A filter as defined in claim 25, wherein the organic cross-linkable polymers are selected from the group consisting of derivatives of acrylic acid, polyurethane, polystyrene, polyisocyanate and polyvinyl acetate.

27. A filter as defined in claim 25, wherein the adhesive mass includes a pre-polymeric low-solvent two-component system based on at least one of masked diisocyanates and polyisocyanate, which are cross-linked to at least one of diamines and polyamines.

28. A filter as defined in claim 2, wherein the adhesive mass includes a hot-melt adhesive.

29. A filter as defined in claim 2, wherein the adhesive mass contains non-masked polymeric diisocyanates and polyisocyanates.

30. A filter as defined in claim 2, wherein the adsorption filter bed is curved in a convex manner opposite to an air flow direction.

31. A filter as defined in claim 2, and further comprising additional reinforcement means placeable between a plurality of the adsorption filter beds.

32. A combination, comprising an air supply duct and a seal-free and frame-free odor and pollutant filter, the filter comprising a self-supporting elastic adsorption filter bed made of a highly-air permeable substrate material, an adsorbent fixed to the substrate material in an amount of 50 to 400 g/l, and an adhesive mass for fixing the adsorbent to the substrate material, the substrate material having a compressibility of at least 2% under a pressure of 1 to $10N/cm^2$, the filter being arranged in the air supply duct under compression in a seal-free and frame-free manner.

33. A combination as defined in claim 32, wherein the air supply duct is an air conditioner air supply duct.

34. A combination as defined in claim 32, wherein the air supply duct is a motor vehicle air supply duct.

* * * * *